United States Patent [19]

Lowe

[11] Patent Number: 5,742,618
[45] Date of Patent: Apr. 21, 1998

[54] RF TRANSPONDER SYSTEM HAVING ERROR DETECTION AND CORRECTION

[75] Inventor: Peter R. Lowe, Colorado Springs, Colo.

[73] Assignee: Palomar Technologies Corporation, Carlsbad, Calif.

[21] Appl. No.: 707,740

[22] Filed: Sep. 4, 1996

[51] Int. Cl.$^6$ .................................................. G06F 11/08
[52] U.S. Cl. .................................................. 371/36; 371/48
[58] Field of Search ........................... 371/36, 67.1, 48; 340/825.54, 825

[56] References Cited

U.S. PATENT DOCUMENTS

| | | | |
|---|---|---|---|
| 4,399,437 | 8/1983 | Falck et al. | 340/825.54 |
| 4,730,188 | 3/1988 | Milheiser | 340/825 |

OTHER PUBLICATIONS

Binstock A. et al., Practical Algorithms for Programmers, Addison–Wesley Publishing Co., pp. 553–569, 1995.
"e5550 Standard R/W Identification IC Preliminary Product Features", Temic Eurosil, Oct. 13, 1994 (pp. 1–6).
"e5550 Standard R/W Identification IC Preliminary Information", Temic Telefunken Semiconductors, pp. 93–106, Dec. 8, 1995.

*Primary Examiner*—Phung M. Chung
*Attorney, Agent, or Firm*—Rodney F. Brown

[57] ABSTRACT

An RF transponder system is provided that is capable of detecting and correcting data transmission errors. The RF transponder system includes an exciter that generates an RF excitation signal and a transponder that receives the RF excitation signal and is powered thereby. The transponder generates and transmits a RF response signal including a plurality of data sets each containing a common message. At least one of the data sets is encoded in a manner different from the remaining data sets. The RF response signal is received by a reader that decodes the encoded data sets. Corresponding bits of each of the data sets are compared for purposes of error detection. If a majority of corresponding bits from each of the data sets match, a valid bit is defined thereby. Bits that are not in the majority are discarded. An invalid bit is defined where less than a majority of corresponding bits match a selected bit of a selected data set.

20 Claims, 3 Drawing Sheets

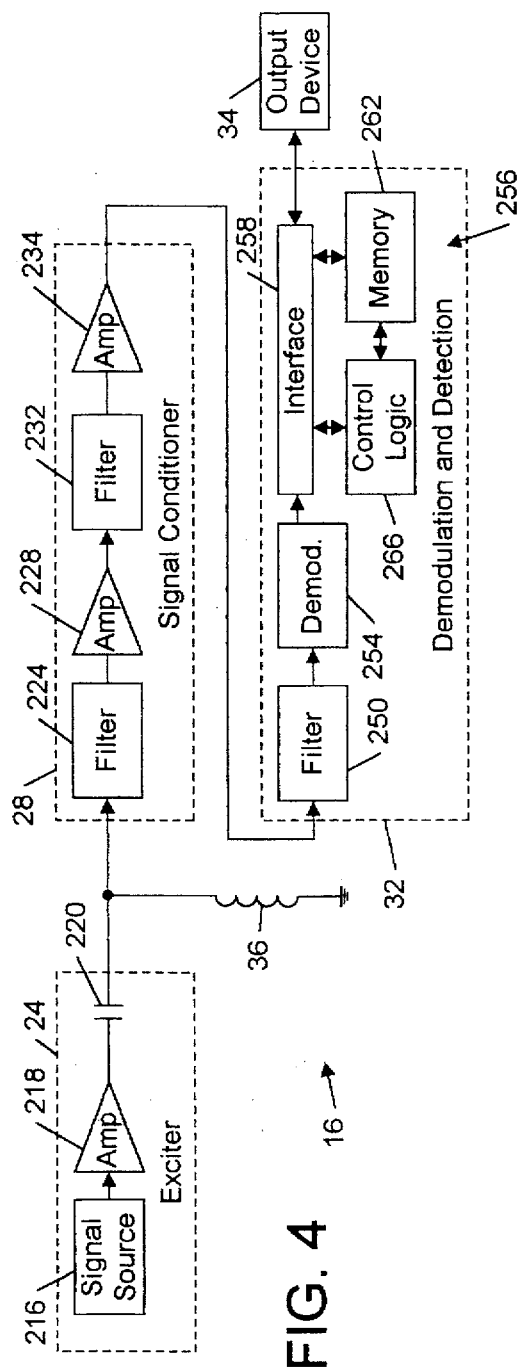
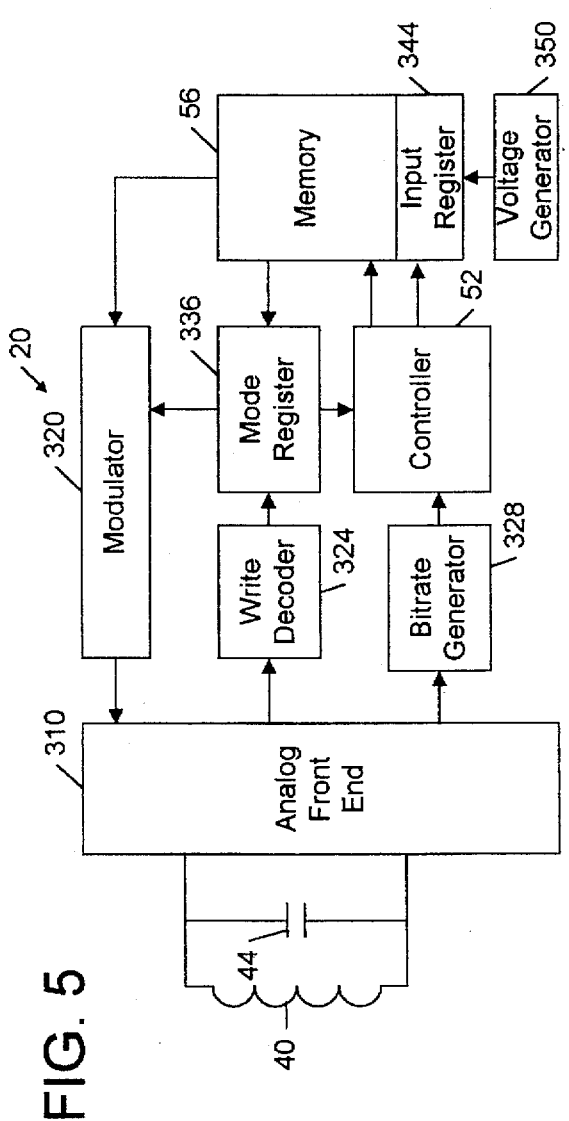
FIG. 4
FIG. 5

RF TRANSPONDER SYSTEM HAVING ERROR DETECTION AND CORRECTION

TECHNICAL FIELD

The present invention relates generally to radio frequency transponder systems and more particularly to an error detection and correction method for a radio frequency transponder system.

BACKGROUND OF THE INVENTION

Radio frequency (RF) transponder systems are used to communicate between remote locations without electrical contact therebetween. RF transponder systems generally include an exciter/reader (ER) and a transponder, otherwise termed a radio frequency identification (RFID) tag. The ER generates an RF excitation signal and transmits it to the transponder that is energized thereby, causing the transponder to generate an identification signal or other data signal and transmit it back to the ER at a particular frequency. Some ERs are also capable of generating a write signal and transmitting it to the transponder, enabling modification of the data signal generated by the transponder. These ERs are referred to herein as exciter/reader/writers (ERWs). RF transponder systems are commonly used to identify or indicate the presence of an object to which the transponder is connected or to transmit information relating to a physical condition such as the air pressure of a tire or the temperature of a fluid in a container.

Conventional RF transponder systems typically exhibit a low signal to noise ratio in environments having relatively high RF noise and at distances approaching the range limits of the RF transponder system. When a conventional RF transponder system operates under these conditions, data errors increase significantly. Therefore, manufacturers recommend operation of conventional RF transponder systems in environments having relatively low RF noise and at distances significantly less than the range limits of the system to minimize the occurrence of data errors.

To improve the accuracy of data received from transponders, some conventional RF transponder systems excite the transponder two or more times and compare the data received by the ERW circuit on the first transmission with the data received by the ERW circuit on subsequent transmissions. If the data received by the ERW circuit from each of the transmissions matches, the data is assumed to be valid and usable. If the data does not match, the data is assumed to be invalid and unusable. If the transponder is operating incorrectly, however, the same data error may be systematically repeated in each transmission. Although all of the data from each of the transmissions received by the ERW circuit matches, the data is erroneous. Thus, the erroneous data will be improperly assumed valid.

Accordingly, it is generally an object of the present invention to provide an improved RF transponder system. In particular, it is an object of the present invention to provide an RF transponder system having fewer data transmission errors. It is another object of the present invention to provide a RF transponder system operable at the outer range limits of the RF transponder system. It is still another object of the present invention to provide an RF transponder system operable in environments having relatively high RF noise. It is yet another object of the present invention to provide an RF transponder system having improved error detection and correction. These objects and others are achieved by the present invention described hereinafter.

SUMMARY OF THE INVENTION

The present invention is a method and apparatus for detecting and correcting data transmission errors in an RF transponder system. In accordance with the invention, an exciter/reader and a transponder are provided and remotely positioned relative to each other. The exciter/reader generates an RF excitation signal and transmits the RF excitation signal to the transponder. The RF excitation signal powers the transponder, causing the transponder to generate an RF response signal that is transmitted back to the exciter/reader. The RF response signal includes a plurality of encoded data sets, each containing a common message. At least one of the data sets, however, is modified by encoding it in a manner different from the remaining data sets. For example, the bit pattern of the at least one modified data set is encoded in reverse relative to the other data sets. The exciter/reader is programmed to restore the one or more modified data sets to the same encoding format as the remaining data sets upon receipt of the RF response signal from the transponder. As in the present example, the exciter/reader restores the one or more modified data sets received from the transponder by reversing the bit pattern of the modified data sets. The exciter/reader then decodes all of the data sets and compares the messages contained therein for the purpose of error detection.

It is apparent that the present error detection method avoids the problem of improper data validation caused by systematic errors in the transponder transmission. Data validation is effected in the present method by individually comparing corresponding bits from each of the data sets. When a majority of corresponding bits is found to match with respect to the data contained therein, the data sets containing the majority bits are deemed valid. Data sets containing bits not in the majority are discarded as invalid data sets.

In a specific application of the present invention, the message of the encoded data set is an identification code used in an access control system, wherein access to a restricted area is granted if the message transmitted by the transponder and received by the exciter/reader matches a message within the exciter/reader. The present invention will be further understood, both as to its structure and operation, from the accompanying drawings, taken in conjunction with the accompanying description, in which similar reference characters refer to similar parts.

BRIEF DESCRIPTION OF THE DRAWINGS

FIG. 4 is a block diagram and electrical schematic of an exciter/reader circuit for the RF transponder system with error detection and correction.

FIG. 5 is a block diagram and electrical schematic of an transponder tag for the RF transponder system with error detection and correction.

FIG. 6 is a block diagram of memory for the RF transponder system with error detection and correction.

DESCRIPTION OF THE PREFERRED EMBODIMENT

Figure 1:
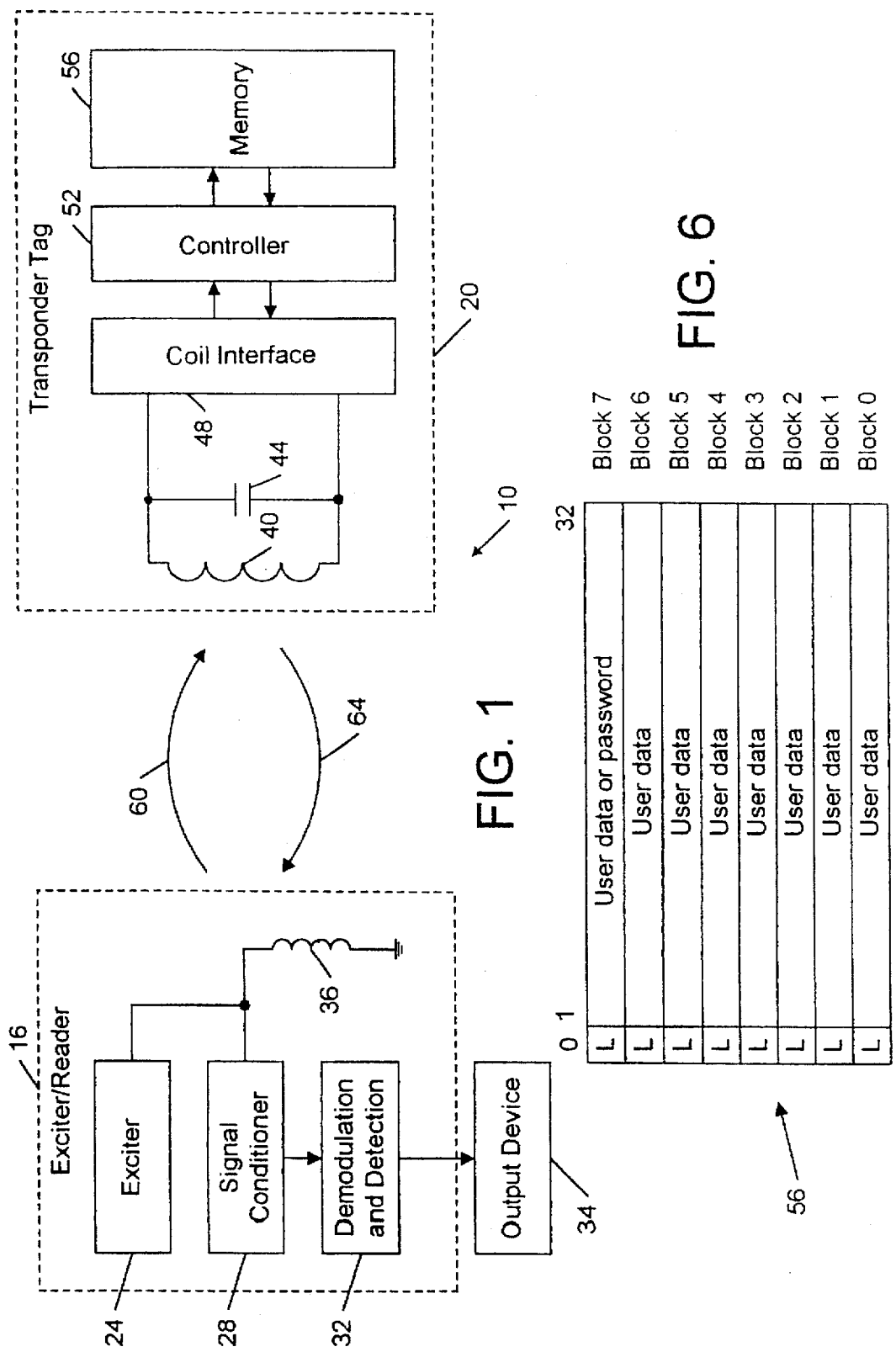
FIG. 1 is a block diagram of a RF transponder system with error correction according to the present invention.

Referring to FIG. 1, an exemplary embodiment of an RF transponder system is shown and generally designated 10. The RF transponder system 10 includes an exciter/reader (ER) circuit 16 and a transponder 20. Skilled artisans can appreciate that the ER circuit 16 can be replaced by an exciter/reader/writer (ERW) circuit capable of programming the transponder 20 by either direct contact or contactless programming. The ER circuit 16 includes an exciter 24, a signal conditioner circuit 28 and a demodulation and detection circuit 32 preferably coupled to an output device 34. An antenna coil 36 is coupled to the signal conditioner circuit 28. The transponder 20 includes an antenna coil 40 and a capacitor 44 coupled to a coil interface 48. A controller 52 is coupled to the coil interface 48 and a memory 56. The ER circuit 16 generates an RF excitation signal 60 and the transponder 20 generates an RF response signal 64 in response to the RF excitation signal in a manner described below.

Figure 2:
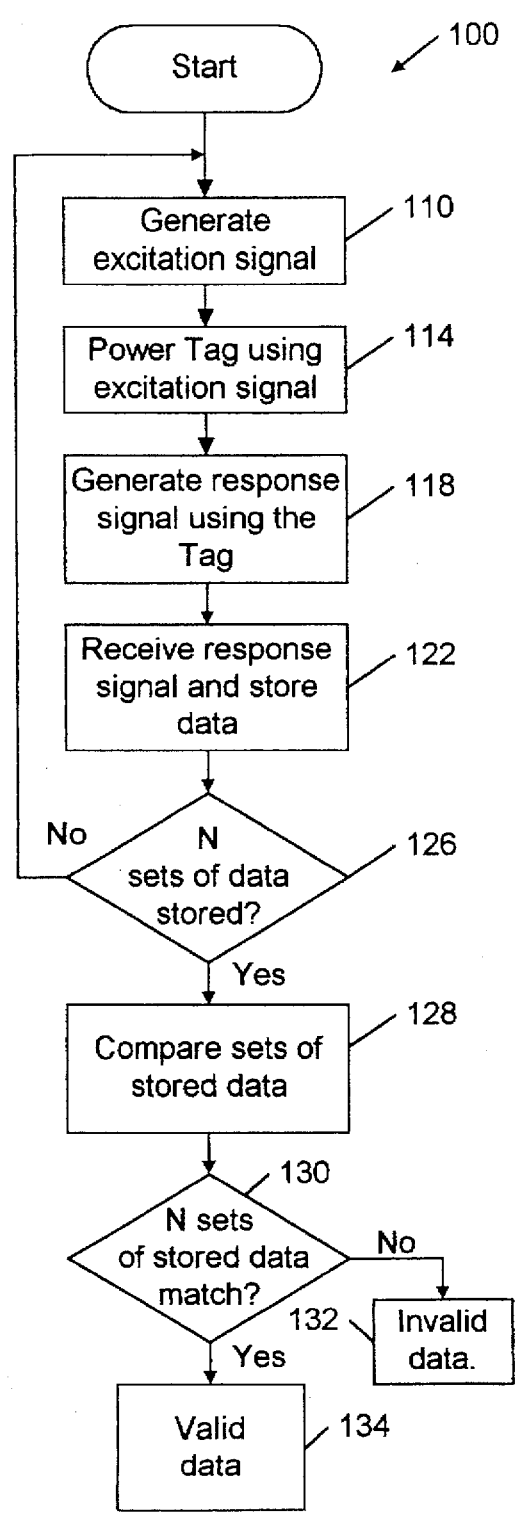
FIG. 2 is a logic diagram for an error detection routine according to the prior art.

Referring to FIG. 2, a method of operating the RF transponder system 10 of FIG. 1 according to the prior art is shown and is generally designated 100. In step 110, the ER circuit 16 generates an RF excitation signal. In step 114, the transponder 20 receives the RF excitation signal and generates power therefrom. In step 118, the transponder 20 generates an RF response signal containing data. In step 122, the ER circuit 16 receives the RF response signal and stores the RF response signal and/or the data contained therein. In step 126, the ER circuit 16 determines whether it has received N sets of data. If not, control returns to step 110 and loops through step 126 until the ER circuit 16 has received N sets of data. If N sets of data have been received, control continues with steps 128 and 130 where the ER circuit 16 compares the stored data and determines whether the N sets of stored data match. If not, then the data is defined as invalid in step 132. If the data matches, the data is defined as valid in step 134. The data is stored in a memory associated with the demodulation and detection circuit 32 and/or transmitted to the output device 34.

Figure 3:
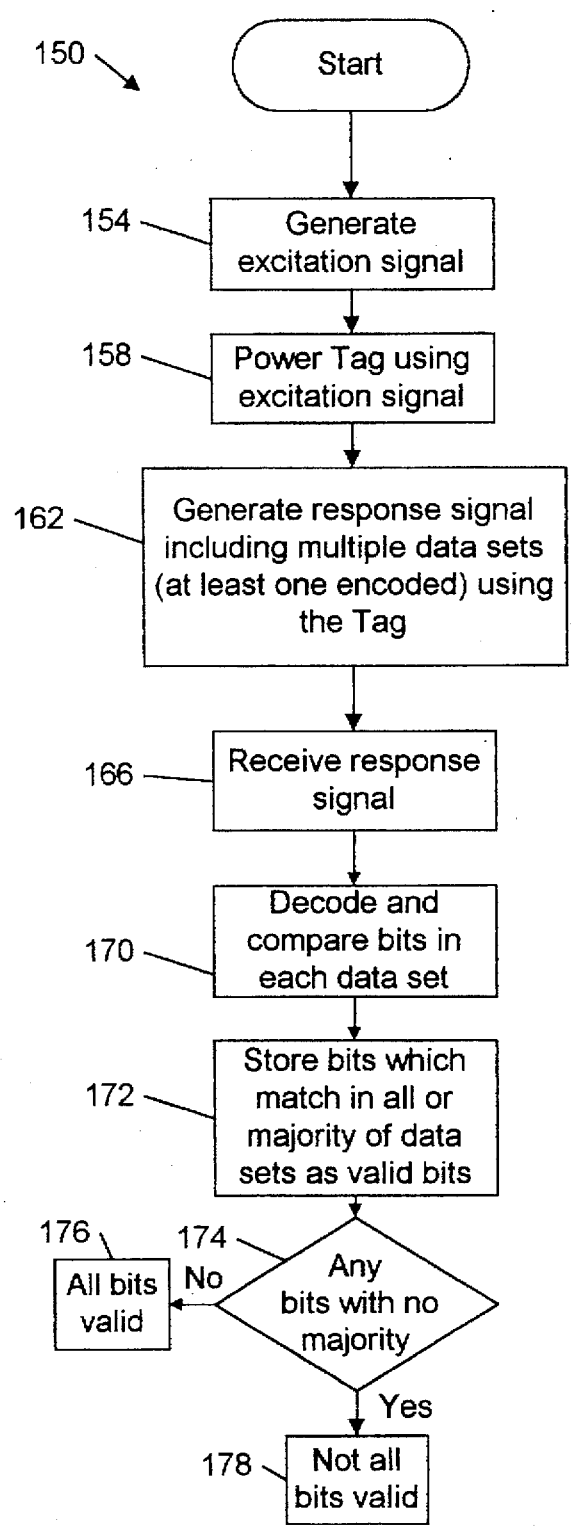
FIG. 3 is a logic diagram for an error detection and correction routine executed by the RF transponder system according to the present invention.

Referring to FIG. 3, a method of operating the transponder of FIG. 1 according to the present invention is shown and is generally designated 150. In step 154, the ER circuit 16 generates an RF excitation signal. In step 158, the transponder 20 receives the RF excitation signal and generates power therefrom. In step 162, the transponder 20 generates an RF response signal. In step 166, the ER circuit 16 receives the RF response signal. In step 170, control associated with the demodulation and detection circuit 32 decodes and stores the data sets in a memory. In step 172, control associated with the demodulation and detection circuit 32 compares the sets of stored data to determine whether the received message contains any valid data. In particular, a selected bit in a selected data set of the received message is defined as containing valid data where all or a majority of corresponding bits of each of the other data sets in the RF response signal matches the selected bit. If none or less than a majority of the corresponding bits match the selected bit, the selected bit is defined as containing invalid data. In step 174, control associated with the demodulation and detection circuit 32 determines whether the received message contains any invalid bits. If not, then all of the bits of the received message are declared valid in step 176. If invalid bits are identified, then the received message is declared invalid in step 178.

Referring to FIG. 4, a suitable ER circuit 16 for short range applications is the MINIPROX reader available from HID Corporation, Tustin, Calif., which can be mechanically configured for mounting in various types of environments. As shown in FIGS. 1 and 4, the ER circuit 16 has three main functional units: the exciter 24, the signal conditioner circuit 28, and the demodulation and detection circuit 32.

The exciter 24 includes an AC signal source 216 followed by a power amplifier 218 that amplifies the signal generated by the AC signal source to provide a high current, high voltage excitation signal to a capacitor 220 and the antenna coil 36. The inductance of the antenna coil 36 and the capacitance of the capacitor 220 are selected to resonate at the excitation signal frequency so that the voltage across the antenna coil 36 is greater than the voltage output of the power amplifier 218. The AC signal source 216 provides the RF excitation signal that can include an identification code or password for the transponder 108.

The signal conditioner circuit 28 is also coupled to the antenna coil 36 and serves to amplify the RF response signal generated by the transponder 20. The signal conditioner circuit 28 filters out the RF excitation signal frequencies as well as other noise and undesired signals outside of the frequency range of the transponder response signals. The signal conditioner circuit 28 includes a first filter 224 that passes the response signal frequency returned from the transponder 20. A first amplifier 228 amplifies the signal output of the first filter 224. A second filter 232 passively excludes the high energy at the excitation frequency. A second amplifier 234 amplifies the signal output by the second filter 232. Preferably the first and second filters 224 and 232 include a bandpass filter and a bandstop filter. Skilled artisans can appreciate that the relative positions of the first and second filters can be switched or a higher order filter providing both filtering functions can be employed. The first and second amplifiers 228 and 234 can also be replaced with a single amplifier.

The amplified output of the signal conditioner circuit 28 is input to a filter 250 of the demodulation and detection circuit 32 that further reduces the excitation signal energy. Preferably the filter 250 is a low pass filter. The demodulation and detection circuit 32 further includes a demodulation circuit 254 and a microcomputer generally designated 256. The microcomputer 256 includes an input/output interface 258, a memory 262, and a microprocessor or control logic 266. The demodulation circuit 254 is typically an FSK demodulator that includes a phase-locked loop circuit configured as a tone detector. The demodulation circuit 254 and the microcomputer 256 extract data from the response signal. To extract the data, digital signals are generated when the return signal from the transponder 20 shies between two frequencies. The timing of the transitions of the digital signals between the logic levels or frequencies is detected. The information obtained by the microcomputer 256 can be stored in the memory 262 or transferred to the output device 34 such as a display, printer, network, another computer or other storage media.

In a specific embodiment of the present invention, the output device 34 is an access control device. The received message or identification code is compared with a stored message or identification code. If the received message or identification code matches the stored message or identification code, then access is granted. If the received message or identification code does not match the stored message or identification code, then access is denied.

Referring to FIG. 5, the transponder 20 includes an analog front end 310 having inputs connected to the antenna coil 40, the capacitor 44, and a modulator 320 and outputs connected to a write decoder 324 and a bitrate generator 328. An output of the write decoder 324 is connected to a first input of a mode register 336. The mode register 336 has outputs coupled to the modulator 320 and the logic controller 52. A second input of the mode register 336 is coupled to a first output of the memory 56. The first and second outputs of the controller 52 are coupled to a first input of the memory 56 and an input register 344 of the memory 56, respectively. A voltage generator 350 has an output coupled to the input register 344.

The analog front end 310 generates power from the current induced on the antenna coil 40 by the RF excitation signal (magnetic field) produced by the ER circuit 20. The analog front end 310 controls the bidirectional data communications with the ER circuit 16. The analog front end 310 rectifies the AC coil voltage to generate a DC supply voltage that powers the transponder 20 and extracts a clock signal from the AC coil voltage. The analog front end 310 selectively switches a load across opposite nodes of the antenna coil 40 for data transmission from the transponder 20 to the ER circuit 16 during the reading mode. The analog front end 310 also detects a field gap that occurs when the ER circuit 16 is attempting to write information into the memory 56 during the writing mode.

The controller 52 loads the mode register 336 with operational data from the memory 56 after power-on and during reading to minimize errors. The controller 52 controls reading and writing access to the memory 56. The controller 52 compares a password transmitted by the ER circuit 16 to the password stored in memory 56 to grant or deny reading or writing access to the data stored in the memory 56.

The bitrate generator 328 allows the selection of bitrates that are a fractional portion of the frequency of the RF excitation signal. Typically, the bitrate generator allows selection of the following bitrates: RF/8, RF/16, RF/32, RF/40, RF/50, RF/64, RF/100, and RF/128. Other bitrate combinations can be provided if desired. The write decoder 324 determines whether a write data stream from the ER circuit 16 is valid. The voltage generator 350 generates a supply voltage for programming the memory 56 during a write signal. The mode register 336 stores the mode data from the memory 56 and periodically refreshes the mode data during reading operation. The modulator 320 allows selection of various different modulation schemes including: frequency shift key (FSK); phase shift key (PSK); Manchester; biphase; and combinations thereof. The memory 56 is preferably EEPROM.

In a preferred embodiment, the transponder 20 is a Temic e5550 Read/Write Identification Integrated Circuit (IDIC®) available from Temic Eurosil, Eching, Germany. Details of the Temic e5550 IDIC® are provided in "e5550 Standard R/W Identification IC Preliminary Product Features" dated Oct. 13, 1994 and in "e5550 Standard R/W Identification IC Preliminary Information" dated Dec. 12, 1995, both of which are incorporated herein by reference. Referring to FIG. 6, the structure of the memory 56 of the Temic e5550 is illustrated in greater detail.

Conventional transponders typically have memory sufficient to store only a single data set for transmission to the response signal. For example, conventional access control transponder systems typically include a message or identification code having 48 data bits. One such transponder chip, identified as Hughes 1849, is written to by contact programming rather than contactless programming. The Hughes 1849 chip allows storage of only one data set containing 48 bits. By comparison, the Temic e5550 chip has 224 useful data bits arranged in 7 blocks each of 32 bits per block. An eighth block contains password or operational mode data. The Temic e5550 chip can hold up to four data sets that are copies of the message or identification code of the type commonly used for access control. At least some of the messages or identification codes are encoded. For example, data sets 1 and 3 preferably contain the message or identification code in its normal format. Data sets 2 and 4, however, contain an encoded form of the message or identification code. Preferably the data sets 2 and 4 are encoded by reversing the bits. Skilled artisans can appreciate that other forms of encoding can be used.

When the ER (or ERW) circuit 16 receives the data sets 1–4 from the transponder 20, the ER circuit 16 decodes the encoded message(s) or identification code(s). In this example, data sets 2 and 4 would require bit reversal before decoding. A comparison of the data sets 1–4 is performed to determine which data sets match. If, for example, data sets 1, 3 and 4 match after taking into effect the bit reversal, but data set 2 does not match, then it is concluded that the message or identification code contained in data sets 1, 3 and 4 is valid and the message or identification code contained in data set 2 is invalid.

The comparisons can also be made in a bit-by-bit manner for increased detection and correction. For example, when data sets 1–4 are received by the ER (or ERW) circuit 16, they are compared for matches. Bit 5 of data sets 1, 3 and 4 match one another, but bit 5 of data set 2 does not match bit 5 of the other data sets. Bit 25 of data sets 2, 3, and 4 match one another, but bit 25 of data set 1 does not match the other data sets. Bit 35 of data sets 1, 2, and 4 match one another, but bit 35 of data set 3 does not bit 35 of the other data sets. The remaining bits 1–4, 6–24, 26–34 and 36–48 of data sets 1–4 all match one another. The error detection and correction method according to the present invention selects bit 5 of data sets 1, 3 and 4 and discards bit 5 of data set 2, selects bit 25 of data sets 2, 3 and 4 and discards bit 25 of data set 1, selects bit 35 of data sets 1, 2, and 4 and discards bit 35 of data set 3, and selects bits 1–4, 6–24, 26–34, and 36–48 of data sets 1–4.

Another exemplary application of the present error detection and correction method is to append one or more data sets containing a message or an identification code stored in the transponder 20 with a validation field, termed a Cyclic Redundancy Check (CRC) field, typically 8 or 16 bits in length. The CRC field is the resultant of a CRC algorithm to which all of the bits of the data set are subjected. CRC algorithms are well known to the skilled artisan and are usually created by the source of the original transponder programming code, such as a remote computer, at the time the transponder is programmed, commonly during the manufacturing process. Examples of CRC algorithms are described in Binstock, A. et al., *Practical Algorithms for Programmers*, Addison-Wesley Publishing Co., pp. 553–569, 1995, incorporated herein by reference. After the ER (or ERW) circuit 16 reads the message or identification code of the data set transmitted by the transponder 20, the ER (or ERW) circuit 16 performs this same algorithm on the message or identification code of the data set. The resultant produced thereby is compared to the CRC field. If there is a match, the data set is assumed to be correct.

As can be appreciated from the foregoing, error detection and correction performed by the present invention improves data reception in RF transponder systems by reducing data transmission errors. Because of reduced data transmission errors and improved error detection and correction, an RF transponder system of the present invention can be operated at the outer range limits and/or in environments having relatively high RF noise.

Various different ER, ERW and transponder circuits can be used depending upon the desired operating range and frequency. More particularly, the method according to the present invention has been illustrated above with an exemplary RF transponder system. Skilled artisans can appreciate that other circuits can be substituted for the transponder 20 and ER circuit 16 described above without departing from the teachings of the present invention. For example, instead of using contactless programming of the transponder 20 described above or by other methods, direct contact programming can be used as taught in U.S. Pat. No. 4,730,188 to Milheiser, incorporated herein by reference. Several different methods of contactless programming an RF transponder having utility herein are known, including "Coded Information Arrangement", U.S. Pat. No. 4,399,437 to Falck et al. and commonly assigned U.S. patent applications entitled "Contactless Programmable Radio Frequency Transponder", U.S. Ser. No. 08/540,631, filed Oct. 11 1995, "RF Identification Tag and Contactless Method of Programming the Same", U.S. Ser. No. 08/514,712, filed Aug. 14, 1995, and "High Field Programmable Transponder System and Method", U.S. Ser. No. 08/316,653, filed Sep. 30, 1994, all of which are incorporated herein by reference. Still other methods of contactless programming will be apparent to skilled artisans.

While the foregoing preferred embodiments of the invention have been described and shown, it is understood that alternatives and modifications, such as those suggested and others, may be made thereto and fall within the scope of the invention.

I claim:

1. A method for detecting data transmission errors in an RF transponder system comprising:

generating an RF excitation signal with an exciter;

powering a transponder with said RF excitation signal;

generating an RF response signal, including a plurality of data sets, each of said data sets comprising a plurality of bits and each of said data sets containing a common message, wherein at least one of said data sets is encoded in a manner different from the remaining data sets, and transmitting said RF response signal to a reader;

receiving said RF response signal at said reader;

decoding said at least one of said encoded data sets with said reader to provide at least one decoded data set;

comparing corresponding bits of each of said at least one decoded data set and said remaining data sets; and defining a selected bit of a selected decoded or remaining data set as a valid bit, if said selected bit matches a majority of said corresponding bits.

2. The method recited in claim 1 further comprising discarding said selected bit, if said selected bit does not match said majority.

3. The method recited in claim 1 further comprising defining said selected bit as an invalid bit, if said selected bit does not match said majority.

4. The method recited in claim 1 wherein said common message includes an identification code.

5. The method recited in claim 1 further comprising granting access to a restricted area if said common message matches a stored message at said reader.

6. The method recited in claim 1 further comprising encoding said at least one of said data sets by reversing a bit pattern of said at least one of said data sets.

7. The method recited in claim 1 further comprising the step of integrating said exciter and said reader into a single circuit.

8. An RF transponder system comprising:

an exciter circuit for generating an RF excitation signal;

a transponder powered by said RF excitation signal for generating an RF response signal, including a plurality of data sets, each of said data sets comprising a plurality of bits and each of said data sets containing a common message, for encoding at least one of said data sets in a manner different from the remaining data sets, and for transmitting said RF response signal;

a reader circuit including a decoder for decoding said at least one of said encoded data sets to provide at least one decoded data set, a comparing circuit for comparing corresponding bits of each of said at least one decoded data set and said remaining data sets; and a voting circuit for defining a selected bit of a selected decoded or remaining data set as a valid bit, if said selected bit matches a majority of said corresponding bits.

9. The RF transponder system recited in claim 8 wherein said reader circuit discards said selected bit, if said selected bit does not match said majority.

10. The RF transponder system recited in claim 8 wherein said reader circuit defines said selected bit as an invalid bit, if said selected bit does not match said majority.

11. The RF transponder system recited in claim 8 wherein said common message is an identification code.

12. The RF transponder system recited in claim 8 further comprising means for granting access to a restricted area if said common message matches a stored message.

13. The RF transponder system recited in claim 8 wherein said at least one of said encoded data sets has a reversed bit pattern.

14. The RF transponder system recited in claim 8 wherein said exciter circuit and said reader circuit are integrated into a single circuit.

15. A method for detecting data transmission errors in an RF transponder system comprising:

generating an RF excitation signal with an exciter;

powering a transponder with said RF excitation signal;

generating an RF response signal, including at least one data set comprising a first plurality of bits defining a message or an identification code, said RF response signal further including a validation field comprising a second plurality of bits produced by applying an algorithm to said first plurality of bits;

transmitting said RF response signal to a reader and receiving said RF response signal including said data set at said reader;

applying said algorithm to said data set received at said reader to produce a third plurality of bits;

comparing said third plurality of bits to said second plurality of bits;

defining said data set as valid, if said third plurality of bits matches said second plurality of bits.

16. The method recited in claim 15 wherein said validation field has 8 bits or 16 bits.

17. The method recited in claim 15 wherein said validation field has fewer bits than said data set.

18. The method recited in claim 15 wherein said algorithm is stored in a memory of said transponder.

19. The method recited in claim 15 wherein said algorithm is stored in a memory of said reader.

20. The method recited in claim 15 wherein said algorithm is created by a remote computer further creating an original programming code for said transponder.

* * * * *